A. SANDERS.
Wheel-Cultivator.

No. 213,943. Patented April 1, 1879.

WITNESSES

INVENTOR
Alexander Sanders
By Gilmore, Smith, & Co.
ATTORNEYS.

UNITED STATES PATENT OFFICE.

ALEXANDER SANDERS, OF EL DORADO, ILLINOIS.

IMPROVEMENT IN WHEEL-CULTIVATORS.

Specification forming part of Letters Patent No. 213,943, dated April 1, 1879; application filed February 8, 1879.

*To all whom it may concern:*

Be it known that I, ALEXANDER SANDERS, of El Dorado, in the county of Saline and State of Illinois, have invented a new and valuable Improvement in Wheel-Cultivators; and I do hereby declare that the following is a full, clear, and exact description of the construction and operation of the same, reference being had to the annexed drawings, making a part of this specification, and to the letters and figures of reference marked thereon.

Figure 1:
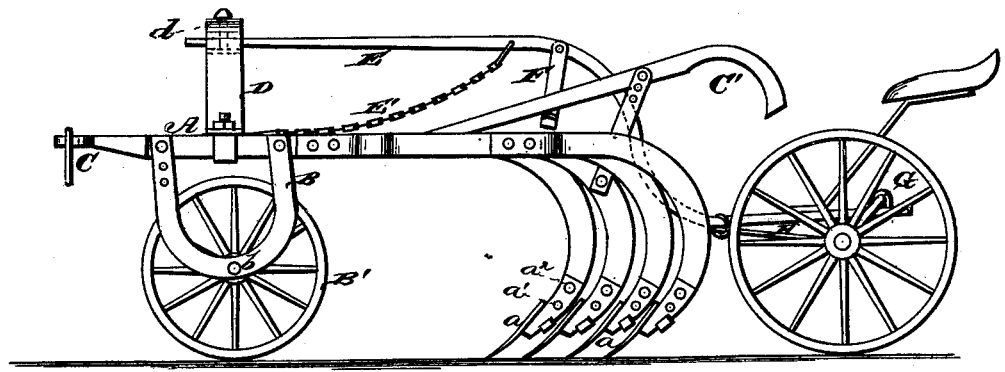
Figure 2:
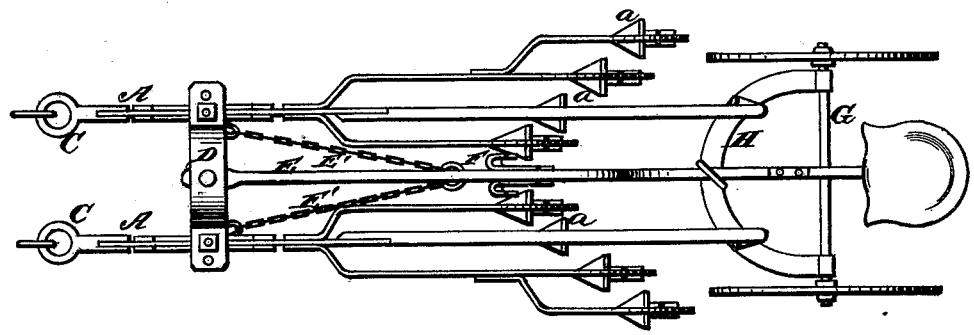

Figure 1 of the drawings is a representation of a side elevation of my wheel-cultivator, and Fig. 2 is a top-plan view of the same.

My invention relates to a cultivator which may be used as a hand or wheel cultivator at will; and the novelty consists in the construction and arrangement of parts, as will be more fully hereinafter set forth.

In carrying out my invention I employ two right and left gangs of plows, connected near the front end of the main beam by a saddle, to the upper part of which is pivoted the tongue of the sulky. A guy-chain leads from the main beam of each gang backward to the sulky-tongue, and two hooks depend from said tongue, upon which the gangs are hung when not in use. The tongue is pivoted to the sulky-axle, and a semicircular bearing allows the wheels to be turned to the right or left in turning corners, so as to make a wide sweep.

A proper spring-catch, or other equivalent device, may be placed at the forward center of this semicircle, to secure the tongue in place when going across the field; but the same must be so arranged as to be within the reach and manipulation of the driver.

The gangs of plows are bolted or otherwise secured to the main beam upon each side, each of which has a framing, in which is journaled the axle of the forward wheel, and the forward end of each main beam is provided with a clevis, to which are secured the whiffletrees.

The handles are so arranged (one from each main beam) as to be within reach of the driver when riding.

In order to disconnect the sulky to use the device as a walking-cultivator, it is only necessary to unbolt the sulky-tongue from the saddle and unfasten the guy-chains, and the disconnection is made.

A tongue may be secured to the saddle to assist in turning.

The gangs of plows are lifted and one of the beams is permitted to rest in the hooks when driving to or from the field and the plows are not in use.

The shovels are pivoted, and are provided with the ordinary break-pins, to prevent breaking the plow when obstructions are met.

Referring to the drawings, A A represent the main beams of the gangs of plows, to which shorter beams are secured, each carrying plows $a$, pivoted at $a^1$, and having wooden break-pins $a^2$.

Each beam has a downward-projecting frame, B, in which is journaled the axle $b$ of the riding-wheel B'; and the forward end of each beam is provided with a clevis, C, and, extending rearward, handles C' C'. These main beams are connected near the forward ends by an arched saddle, D, perforated at $d$ to receive a king-bolt, which secures the sulky-tongue E and a driving-tongue (not shown) to the said saddle.

Guy-chains E' extend from the tongue E forward on each side to the main beams, as shown.

Hooks F upon each side of the tongue E receive the gangs of plows when elevated out of contact with the ground.

The tongue is loosely pivoted to the sulky-axle G, carrying the ordinary sulky-wheels, and said tongue is adjacent to a semicircular bearing, H, as shown. The tongue is susceptible of being secured to the forward center of this bearing H when crossing the field, but may be readily disengaged, so as to make a long sweep in turning, governed by the feet of the driver.

The operation of this invention is obvious from the foregoing description.

I claim as my invention—

1. The double gangs of plows A $a$ $a^1$ $a^2$, connected by the saddle D, wheels B', and guy-chains E', combined with a sulky-tongue, E, as and for the purpose set forth.

2. The arched saddle D, main beams A, and double gang of plows, in combination with the axle G and wheels, tongue E, and semicircular bearing H, substantially as and for the purposes set forth.

In testimony that I claim the above I have hereunto subscribed my name in the presence of two witnesses.

ALEXANDER SANDERS.

Witnesses:
J. H. MUSGRAVE,
J. C. STINSON.